United States Patent [19]

Sato et al.

[11] 4,395,761

[45] Jul. 26, 1983

[54] ANTISKID BRAKE CONTROLLING METHOD AND APPARATUS FOR VEHICLES

[75] Inventors: Makoto Sato, Kamifukuoka; Taiji Ohmori; Yoshikazu Tsuchiya, both of Kawagoe, all of Japan

[73] Assignee: Honda Giken Kogyo Kabushiki Kaisha, Tokyo, Japan

[21] Appl. No.: 261,142

[22] Filed: May 6, 1981

[30] Foreign Application Priority Data

May 15, 1980 [JP] Japan ................................. 55-64546
Sep. 13, 1980 [JP] Japan ............................... 55-127810

[51] Int. Cl.$^3$ .............................................. B60T 8/02
[52] U.S. Cl. .................................... 364/426; 303/106; 303/105; 303/99
[58] Field of Search ................... 364/426; 303/97, 99, 303/105, 106

[56] References Cited

U.S. PATENT DOCUMENTS

| | | | |
|---|---|---|---|
| 3,556,610 | 1/1971 | Leifer | 303/105 |
| 3,820,857 | 6/1974 | Schnaibel et al. | 303/105 |
| 4,036,536 | 7/1977 | Quon | 303/97 |

Primary Examiner—J. V. Truhe
Assistant Examiner—Saul M. Bergmann
Attorney, Agent, or Firm—Posnack, Roberts, Cohen & Spiecens

[57] ABSTRACT

An antiskid brake controlling method and apparatus comprising: comparing by a first comparator and during braking of a vehicle, a wheel speed signal $V_w$ representative of the peripheral speed of a wheel of the vehicle with a first reference wheel speed signal $V_{R1}$ less than a vehicle speed signal $V_E$ and with a second reference wheel speed signal $V_{R2}$ which is less than the first reference wheel speed signal $V_{R1}$; comparing by a second comparator a wheel acceleration signal $\overset{\circ}{V}_w$ representative of the peripheral acceleration of the wheel with a first reference wheel acceleration signal $\overset{\circ}{V}_{w1}$ representing a predetermined positive peripheral acceleration of the wheel, a second reference wheel acceleration signal $\overset{\circ}{V}_{w2}$ greater than the first reference wheel acceleration signal and a reference wheel deceleration signal $-\overset{\circ}{V}_{w3}$ representative of a predetermined negative peripheral acceleration of the wheel. The comparators are connected through an electrical circuit to solenoids of control valves which regulate flow of pressure fluid to a wheel brake cylinder for selectively counteracting the pressure of brake fluid from a master cylinder to the brake cylinder or maintaining constant pressure in the brake cylinder. The electrical circuit is operative to decrease the braking torque $T_B$ from an instant at which the wheel acceleration signal $\overset{\circ}{V}_w$ has dropped below the reference wheel deceleration signal $-\overset{\circ}{V}_{w3}$ when the wheel speed signal $V_w$ is less than the first reference wheel speed signal $V_{R1}$ but greater than the second reference wheel speed signal $V_{R2}$; to stop the decrease of the braking torque $T_B$ after the wheel acceleration signal $V_w$ comes to increase again, at an instant at which the wheel acceleration signal $\overset{\circ}{V}_w$ exceeds the reference wheel deceleration signal $-\overset{\circ}{V}_{w3}$; and also to decrease the braking torque $T_B$ until the wheel acceleration signal $V_w$ increases to exceed the first reference wheel acceleration signal $V_{w1}$ when the wheel speed signal $V_w$ has dropped below the second reference wheel speed signal $V_{R2}$.

17 Claims, 8 Drawing Figures

ANTISKID BRAKE CONTROLLING METHOD AND APPARATUS FOR VEHICLES

BACKGROUND OF THE INVENTION

1. Field of the Invention

The present invention relates to an antiskid brake controlling method and apparatus for a vehicle for preventing locking of the wheels of the vehicle during braking of the vehicle.

2. Description of the Prior Art

In an abrupt braking of a vehicle, an excessively large braking input exerted on the vehicle wheel causes a locking of the wheel resulting in a lowered braking efficiency. In order to avoid this undesirable locking of the wheel, it is preferred to automatically control the braking torque independently of the braking input by the manual control, such that the slip rate of the wheel falls between 15 and 25%.

Figure 1:
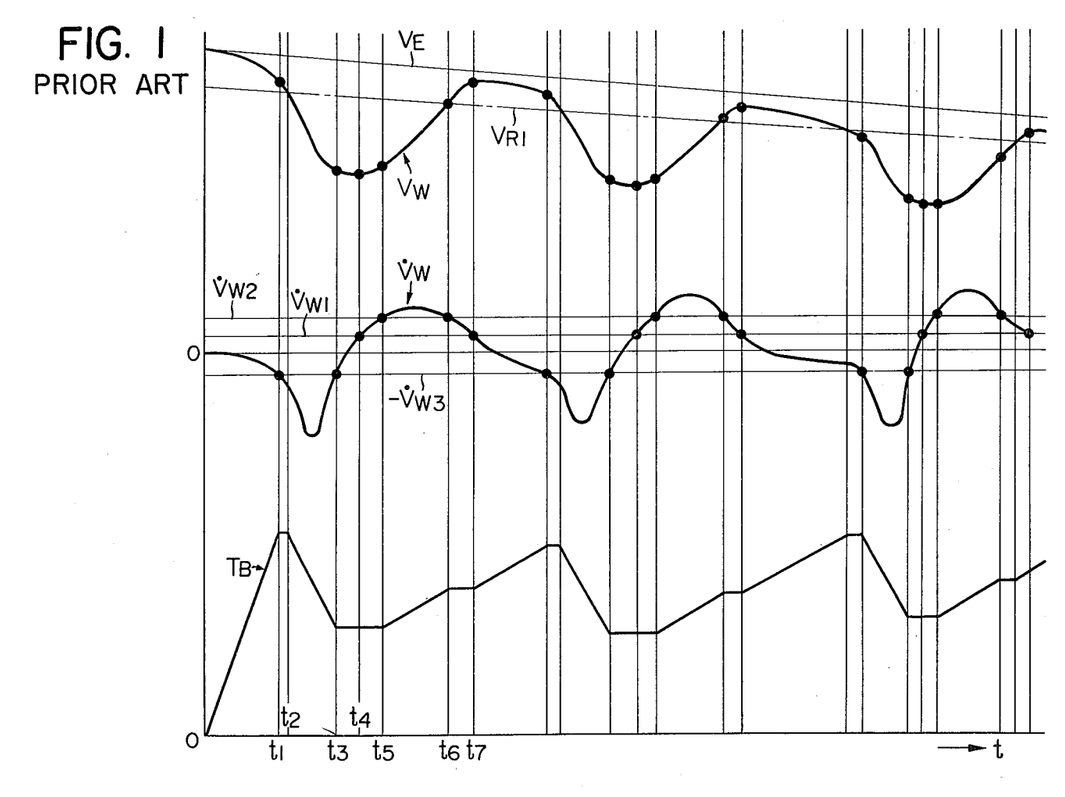
FIG. 1 is a diagram showing a conventional method for controlling the braking torque applied to a wheel to achieve an antiskid control during braking.
Figure 2:
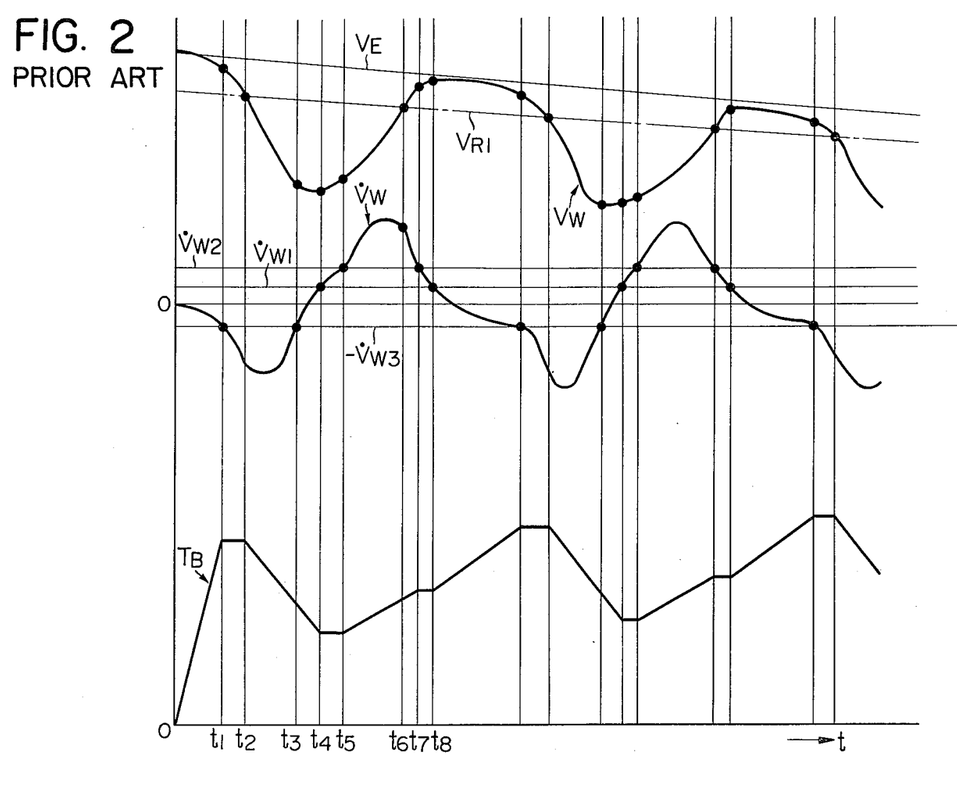
FIG. 2 is a diagram showing another known method for controlling the braking torque.

FIGS. 1 and 2 illustrate conventional methods of controlling the braking torque.

In the method shown in FIG. 1, the braking torque $T_B$ applied to the wheel is drastically increased from the beginning of the braking operation. In consequence, the acceleration $\dot{V}_w$ of the wheel is gradually decreased. At a time $t_1$ at which the wheel acceleration $\dot{V}_w$ drops below a reference vehicle deceleration $-\dot{V}_{w3}$, the braking torque $T_B$ is maintained constant. Then, at a time $t_2$ at which the wheel speed $V_w$ drops below a reference wheel speed $V_R$ to create the possibility of locking of the wheel, the braking torque $T_B$ is decreased. As a result, the wheel acceleration $\dot{V}_w$ first decreases further and then increases to exceed the aforementioned reference wheel deceleration $-\dot{V}_{w3}$ at a time $t_3$. The decrease of the braking torque $T_B$ is halted at this moment $t_3$ and is then maintained constant. In consequence, the wheel acceleration $\dot{V}_w$ further increases and becomes positive causing an increase in the wheel speed $V_w$. Then, at time $t_5$ at which the reference wheel acceleration $+\dot{V}_{w2}$ is exceeded by the wheel acceleration $\dot{V}_w$, the braking torque $T_B$ is increased and there is first a net increase of the wheel acceleration $V_w$ whereafter the wheel acceleration $\dot{V}_w$ decreases. At a time $t_6$ at which the wheel acceleration $\dot{V}_w$ drops below the aforementioned reference wheel acceleration $+\dot{V}_{w2}$, the braking torque $T_B$ is maintained constant to cause the wheel acceleration $\dot{V}_w$ to decrease. As this wheel acceleration $\dot{V}_w$ drops below another reference wheel acceleration $+\dot{V}_{w1}$ at time $t_7$, the braking torque $T_B$ is increased again. In consequence, the wheel acceleration $\dot{V}_w$ is further decreased below the aforementioned reference wheel deceleration $-\dot{V}_{w3}$ and the braking torque $T_B$ is then maintained constant. Thereafter, this braking cycle is repeated as desired. As a consequence, the wheel speed $V_w$ is gradually decreased smoothly while repeating momentary increase and decrease as shown in FIG. 1.

According to this control method, the decrease of the braking torque is stopped at the time $t_3$ at which the wheel acceleration $\dot{V}_w$ exceeds the reference wheel deceleration $-\dot{V}_{w3}$, i.e. before the wheel deceleration is completely eliminated. This is undertaken in order to take into account the time lag of operation of the braking system such as the hydraulic system. Namely, at the instant at which the decrease of the braking torque $T_B$ is actually stopped, the braking torque $T_B$ has been decreased to such a level as to completely eliminate the wheel deceleration and, on the contrary, to generate an increase of the wheel speed.

This control method, however, imposes the following problem. In the event that the vehicle travels from a road having a surface of a high coefficient of friction to a slippery road having a low coefficient of friction during the braking, the time interval until the wheel is locked is so short that the wheel is undesirably locked before the braking torque is lowered to a sufficiently low level. As soon as the wheel is locked, the wheel deceleration is decreased to stop the decrease of the braking torque $T_B$, so that the wheel is kept locked without allowing the recovery of the wheel speed $V_w$. In this state, the anti-skid effect can no longer be achieved.

In order to avoid this disadvantage, it is desirable to continue the decrease of the braking torque $T_B$ until the wheel speed $V_w$ begins to be recovered, i.e. until a predetermined wheel acceleration $+\dot{V}_{w1}$ is obtained, even after locking of the wheel, to ensure the recovery of the wheel speed $V_w$ thereby to obtain a good antiskid effect.

In the actual braking mechanism, however, the control system as shown in FIG. 2 causes an excessive decrease of the braking torque $T_B$ which lowers the braking efficiency due to the inevitable time lag of operation. Therefore, the control system shown in FIG. 1 is generally preferred except for the special case as mentioned before.

The ordinary antiskid braking system has a hydraulic brake device including a master cylinder for generating hydraulic pressure and a wheel cylinder to which the hydraulic pressure is applied to brake the wheel. Also, a control chamber is provided to introduce working fluid under high pressure to the braking system thereby to control the operation of the wheel cylinder irrespective of the level of the hydraulic pressure generated in the master cylinder. In the case where there is a possibility of locking of the wheel due to excessively large braking force, a hydraulic control circuit detects such possibility and controls the hydraulic pressure in the control chamber to decrease the braking torque applied to the wheel or to maintain the same at a constant level. This hydraulic control circuit includes a normally closed inlet valve adapted to be switched by an inlet solenoid and disposed in a high-pressure fluid passage interconnecting the source of the high fluid pressure and the control chamber, as well as a normally closed outlet valve adapted to be switched by an outlet solenoid and disposed in a low-pressure fluid passage interconnecting the control chamber and an oil tank opened to the atmosphere.

In the antiskid brake device of the type described, the control chamber of the braking system is disconnected from the source of the hydraulic pressure but is in communication with the oil tank in the normal state in which a signal is delivered neither to the inlet solenoid nor to the outlet solenoid. In this state, the braking torque applied to the wheel is changed in accordance with the braking input of the operator. Then, when the possibility of locking of the wheel is achieved, the signal is delivered to the outlet solenoid so that the outlet valve is closed and the control chamber is isolated from the oil tank to lock the working fluid in the control chamber. Consequently, the braking torque is maintained at a constant level irrespective of the braking input of the driver. Furthermore, when both the inlet solenoid and outlet solenoid receive signals because of the possibility of locking of the wheel, the inlet valve is opened while the outlet valve is closed to permit the working fluid of high pressure to come from the hydraulic pressure source of the control circuit into the control chamber. At the same time, the control chamber is isolated from the oil tank so that the pressure in the wheel cylinder is decreased resisting the hydraulic pressure generated in the master cylinder. Namely, the braking torque is decreased irrespective of the braking input of the driver.

In the antiskid braking system of the type described, there is the problem that the hydraulic pressure in the control chamber is locked to hinder the braking operation when the low-pressure passage interconnecting the control chamber and the oil tank is clogged. To avoid this, it is necessary to select a sufficiently large cross-sectional area of the low-pressure fluid passage from being clogged. A clogging of the high-pressure fluid passage is not so serious because it does not hinder the ordinary braking function although the supply of the control hydraulic pressure to the control chamber is interrupted. However, the antiskid braking function is eliminated in this case, and hence it is preferred to provide a sufficiently large cross-sectional area for the high-pressure fluid passage as well.

An increase of the cross-sectional area in the high-pressure fluid passage and low-pressure fluid passage causes a large rate of pressure rise and drop in the control chamber. Assuming that the time lag of operation of the whole braking system is constant, the overshoots of the decrease and increase of the braking power are increased to amplify the vibration of the vehicle chassis resulting in a deteriorated braking sensation.

SUMMARY OF THE INVENTION

It is, therefore, a major object of the invention to provide an antiskid brake controlling method for vehicles in which the advantages of the aforementioned two braking systems are combined such that, while the braking is effected in accordance with the control system as shown in FIG. 1, the braking is controlled by the system shown in FIG. 2 when the vehicle travels, during abrupt braking, from a road having a comparatively large coefficient of friction, to a road having a comparatively small coefficient of friction, thereby to ensure a superior antiskid brake control and a high braking effect.

Another object of the invention is to provide antiskid brake controlling apparatus in which even if the cross-sectional areas of the fluid passages for charging and discharging the fluid to and from the control chamber of the braking system are enlarged, the increasing and decreasing rate of fluid pressure in the control chamber is reduced to suppress excessive reduction or increase of the braking torque applied to the wheel during braking, thereby to overcome the aforementioned problem of the prior art.

To these ends, according to one aspect of the invention, there is provided an antiskid brake controlling method comprising the steps of: comparing, during braking of a vehicle, a wheel speed signal $V_w$ representative of the peripheral speed of a wheel with a first reference wheel speed signal $V_R1$ smaller than a vehicle speed signal $V_E$ and with a second reference wheel speed signal $V_R2$ which is lower than the first reference wheel speed signal $V_R1$ by an amount related to a slip rate of the wheel; comparing a wheel acceleration signal $\dot{V}_w$ representing the peripheral acceleration of the wheel with a first reference wheel acceleration signal $\dot{V}_{w1}$ representing a predetermined positive peripheral acceleration of the wheel, a second reference wheel acceleration signal $\dot{V}_{w2}$ higher than the first reference wheel acceleration signal and a reference wheel deceleration signal $-\dot{V}_{w3}$ representative of a predetermined negative peripheral wheel acceleration; reducing the braking torque $T_B$ from the moment at which the acceleration signal $\dot{V}_w$ drops below the reference wheel deceleration signal $-\dot{V}_{w3}$ when the wheel speed signal $V_w$ is less than the first reference wheel speed signal $V_R1$ and greater than the second reference wheel speed signal $V_R2$; stopping the reduction of the braking torque $T_B$ after said wheel acceleration signal $\dot{V}_w$ begins to increase again and when the wheel acceleration signal $\dot{V}_w$ has increased to exceed the reference wheel deceleration speed $-\dot{V}_{w3}$; and reducing the braking torque $T_B$ until the wheel acceleration signal $\dot{V}_w$ increases to exceed the first reference wheel acceleration signal $\dot{V}_{w1}$ when the wheel speed signal $V_w$ has dropped below the second reference wheel speed signal $V_R2$.

Therefore, when the wheel is braked during travel on a road having a high coefficient of friction, the reduction of the braking torque $T_B$ is stopped when the wheel acceleration signal $\dot{V}_w$ comes to exceed the reference wheel deceleration signal $-\dot{V}_{w3}$, whereby unnecessary reduction of the braking torque is avoided and the braking effect is improved and the braking distance reduced. On the other hand, when the vehicle travels onto a slippery road during the braking, the braking torque is decreased continuously after the wheel acceleration signal $\dot{V}_w$ starts to increase again until it has increased sufficiently to exceed the first wheel acceleration signal $\dot{V}_{w1}$. As a consequence, excessive reduction of the wheel speed signal which would otherwise cause a locking of the wheel is avoided without fail.

According to another aspect of the invention, there is provided an antiskid brake controlling device for use with wheeled vehicles comprising: a fluid brake mechanism associated with a vehicle wheel and including a master cylinder for producing brake fluid pressure in accordance with brake input of an operator, an operating member, a first fluid chamber defined on one side of said operating member and communicating with said master cylinder for driving the operating member under the action of fluid pressure in the master cylinder, and a second fluid chamber defined on the opposite side of said operating member to apply thereto a fluid pressure counteracting the fluid pressure applied to said operating member on said one side thereof; a source of fluid pressure; a high-pressure fluid line connecting said second chamber and said source of fluid pressure; a fluid reservoir; a low-pressure fluid line connecting said second chamber and said fluid reservoir; an inlet valve in said high-pressure line for the opening and closing thereof; an outlet valve in said low-pressure line for the opening and closing thereof; command system means for controlling the operation of said inlet and outlet valves to effect an antiskid brake controlling operation such that fluid pressure in said first chamber is increased in accordance with the operator's braking input during brake application to apply braking torque to said wheel; and hydraulic pressure in said second chamber is increased when the braking torque applied to said wheel is excessively increased to cause wheel locking, and decreased when the braking torque is sufficiently reduced so that there is no possibility of wheel locking; and means for intermittently opening and closing said inlet and outlet valves respectively in a vibratory manner to reduce the flow rate of fluid coming into or outgoing from said second hydraulic chamber when fluid pressure in said second chamber is increased or decreased.

For increasing the braking torque, the inlet valve is opened and closed intermittently whereas for decreasing the braking torque, the outlet valve is opened and closed discontinuously. Accordingly, undesirable abrupt charging and discharging of the working fluid to and from the control chamber is avoided even when the cross-sectional areas of the high-pressure fluid passage and low-pressure fluid passage are increased to avoid clogging, so that the rise and drop of hydraulic pressure in the control chamber are suitably delayed to suppress excessive increase and decrease of the braking torque thereby avoiding undesirable vibration of the chassis during operation of the antiskid braking system.

When the wheel speed signal $V_w$ is smaller than the first reference wheel speed signal $V_{R1}$ and greater than the second reference wheel speed signal $V_{R2}$, the inlet valve is opened and closed intermittently and the outlet valve is closed from the instant at which the wheel acceleration signal $\dot{V}_w$ has dropped below the first reference wheel deceleration signal $-\dot{V}_{w3}$ to decrease the braking torque $T_B$. Thereafter, the inlet valve is closed at the moment at which the wheel acceleration signal $\dot{V}_w$ is increased to exceed the first reference wheel deceleration signal $-\dot{V}_{w3}$ to stop the decrease of the braking torque. When the wheel speed signal $V_w$ as dropped below the second reference wheel speed signal $V_{R2}$, the outlet valve is opened and closed intermittently to decrease the braking torque until the wheel acceleration signal $\dot{V}_w$ is recovered to exceed the first reference wheel acceleration signal $\dot{V}_{w1}$. The intermittent opening and closing of the inlet valve is stopped, when the wheel acceleration signal $\dot{V}_w$ has become smaller than a second reference wheel deceleration signal $-\dot{V}_{w4}$ having an absolute value greater than the first reference wheel deceleration signal $-\dot{V}_{w3}$, but the inlet valve is opened continuously to abruptly decrease the braking torque $T_B$.

According to this arrangement, the inlet valve is kept opened continuously when the vehicle passes onto a road having a high coefficient of friction and then to a slippery road, so as to abruptly increase the hydraulic pressure in the control chamber thereby to promptly decrease the braking torque to avoid locking the wheel without fail.

The intermittent opening and closing operation of the outlet valve and inlet valve is allowed only when the vehicle speed is higher than a predetermined speed during the braking. Namely, the intermittent opening and closing action of these valves is prevented during ordinary travel of the vehicle in which the brake is not used, so that the durability of the apparatus as a whole is very much enhanced.

The above and other objects, features and advantages of the invention will become apparent from the following description of the invention when read in conjunction with the accompanying drawings which illustrate presently preferred embodiments of the invention.

DESCRIPTION OF THE PREFERRED EMBODIMENTS

Hereinafter, preferred embodiments of the invention will be described with reference to the accompanying drawings.

Figure 3:
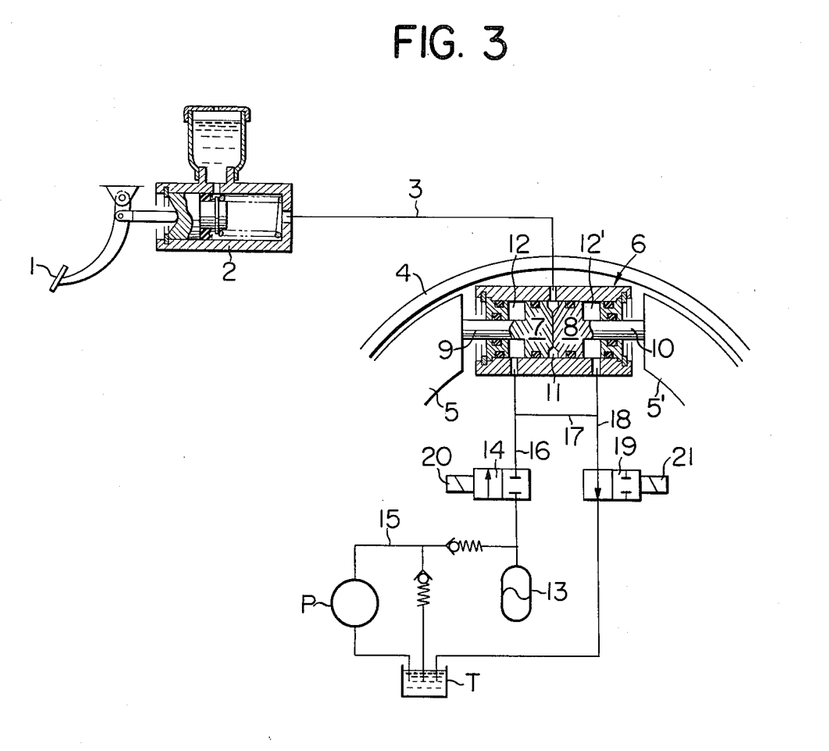
FIG. 3 is a hydraulic circuit diagram of an antiskid braking apparatus for carrying out the invention.

Refering to FIG. 3 therein is seen a brake pedal 1 operatively connected to a master cylinder 2. As pedal 1 is depressed by the driver, the master cylinder 2 produces hydraulic pressure therein. The master cylinder 2 is in communication via a passage 3 with a braking chamber 11 defined between a pair of pistons 7, 8 received by a wheel cylinder 6 mounted on the vehicle chassis. Rods 9,10 of respective pistons 7,8 extend outwardly beyond the end walls of the wheel cylinder 6 and are connected to corresponding pairs of brake shoes 5, 5' which are adapted to produce braking torque by making frictional contact with a brake drum 4 mounted on the wheel. Therefore, as the master cylinder 2 produces hydraulic braking pressure upon depression of the brake pedal 1, the hydraulic braking pressure is transmitted into the braking chamber 11 through the passage 3, so that the pistons 7 and 8 are urged away from each other to press respective shoes 5,5' against the friction surfaces of the brake drum 4. In consequence, the shoes 5,5' and the brake drum 4 cooperatively produce a braking torque.

If the braking pressure in the braking chamber 11 is excessively large, an excessively large braking torque is generated between the braking shoes 5,5' and the brake drum 4 which can undesirably lock the wheel.

In order to avoid locking of the wheel, a pair of control chambers 12,12' are formed between the pistons 7,8 and opposing end walls of the wheel cylinder 6. Namely, when the wheel is going to be locked due to an excessively large braking pressure in the braking chamber 11, the braking pressure in the control chambers 12,12' is suitably controlled to oppose the displacements of the pistons 7,8 caused by the hydraulic pressure.

Hereinafter will be described the controlling apparatus for effecting the control of the braking pressure in the control chambers 12,12'.

Working fluid is sucked up from an oil reservoir T and then pressurized by a pump P and is introduced through an oil passage 15 and an accumulator 13 to the inlet port of an inlet valve 14 which is adapted to be actuated by an inlet solenoid 20. The inlet valve 14 has an outlet port which is connected through a fluid passage 16 to control chamber 12 and further to control chamber 12' through a fluid passage 17.

The control chamber 12 is in communication through the passages 16,17 and 18 with the inlet port of an outlet valve 19 which is adpated to be actuated by an outlet solenoid 21. The inlet port of the outlet valve 19 is also connected to the control chamber 12' through the passage 18. The outlet port of the outlet valve 19 is connected to the oil reservoir T.

In FIG. 3, the inlet valve 14 is shown in a state switched to the left. In this state, the control chambers 12,12' are disconnected from the pump P and the accumulator 13. Then, as the inlet solenoid 20 operates upon receipt of a signal, the inlet valve 14 is switched to the right so that the pressurized braking fluid is fed forcibly into the control chambers 12,12' through the accumulator 13 and the inlet valve 14 to urge the pistons 7,8 toward each other overcoming the braking hydraulic pressure in the control chamber 11.

The outlet valve 19 is normally held in the right position as viewed in FIG. 3. In this state, the control chambers 12,12' are open to the oil reservoir T through the outlet valve 19. When the outlet solenoid 21 actuates the outlet valve 13 upon receipt of a signal, the outlet valve 19 is switched to the left so that the control chambers 12,12' are isolated from the oil reservoir T.

The first state is assumed as being that in which the inlet valve 14 and the outlet valve 19 are in the left and right positions, respectively, i.e. neither the solenoid 20 nor the solenoid 21 receive a signal. In this state, the control chambers 12,12' are open to the oil reservoir T so that the pistons 7,8 are moved solely by the braking pressure in the braking chamber 11. Therefore, the braking torque is freely increased and decreased in accordance with the braking operation effected by the driver.

In a second state in which the outlet valve 19 has been switched to the left, i.e. when a signal is delivered to the outlet solenoid 21, the control chambers 12,12' are disconnected from the oil reservoir T so that the working fluid in the control chambers 12,12' is locked. Therefore, further movement of the pistons 7,8 is prevented even when the braking pressure in the braking chamber 11 is increaed continuously. In consequence, the braking torque is maintained constant independently of the braking operation of the driver. This second state is realized in the case where there is a possibility of locking of the wheel.

In a third state in which the inlet valve 14 is switched to the right while the outlet valve 19 is switched to the left, i.e. when both of the solenoids 20,21 receive signals, the control fluid supplied from the pump P is fed to the control chambers 12,12' through the accumulator 13 and the inlet valve 14. At the same time, the control chambers 12,12' are disconnected from the oil reservoir T. In consequence, the pistons 7,8 are urged toward each other overcoming the braking hydraulic pressure in the braking chamber 11. As a result, the braking torque is decreased independently of the braking operation of the driver. This third state applies to the case where the wheel is going to be locked.

The construction and operation of the controller for controlling the solenoids 20,21 will be described after with reference to FIG. 4. A wheel speed signal $V_w$ representative of the wheel speed detected by a wheel speed detector 22 is delivered to an electronic control circuit 23 which in turn calculates and produces a wheel acceleration signal $\dot{V}_w$ and an estimated vehicle speed VE from the wheel speed signal $V_w$. The control circuit then makes a comparison of the wheel speed signal $V_w$ with a predetermined first reference wheel speed signal $V_R^1$ and with a second reference wheel speed signal $V_R^2$ which is less than 30% of the estimated vehicle speed VE (slip rate assumed 70% or greater). In addition, the control circuit 23 makes a comparison of the calculated wheel acceleration signal $\dot{V}w$ with a predetermined first reference wheel acceleration signal $+\dot{V}_{w1}$, a second reference wheel acceleration signal $+\dot{V}_{w2}$ which is greater than the first one, and with a reference wheel deceleration signal $-\dot{V}_{w3}$ representative of a negative wheel acceleration. The control circuit 23 generates an output $\lambda_1$ when the wheel speed signal $V_w$ is smaller than the first reference wheel speed signal $V_R^1$ and produces an output $\lambda_2$ when the wheel speed signal $V_w$ is smaller than the second reference wheel speed signal $V_R^2$. At the same time, the control circuit 23 produces an output signal $w_1$ when the wheel acceleration signal $\dot{V}_w$ is greater than the first reference wheel acceleration signal $\dot{V}_{w1}$. Also, output signals $w_2$ and $-w_3$ are produced when the wheel acceleration signal $\dot{V}_w$ is greater than the second reference wheel acceleration signal $\dot{V}_{w2}$ and greater than the reference wheel deceleration signal $-\dot{V}_{w3}$, respectively. The signal $\lambda_2$ produced by the electronic control circuit 23 is delivered to an AND circuit 24, whereas the output signal $+w_1$ is delivered to an OR circuit 26 and inverted by an inverter 27 and is delivered also to the AND circuit 24. The output signals $\lambda_1$ and $-w_3$ are delivered to an AND circuit 25 and an OR circuit 26, while the output signal $+w_2$ is delivered to an AND circuit 30 after an inversion by an inverter 28. The AND circuit 24 produces an output when the control circuit 23 is producing the output signal $\lambda_2$ while the signal $+w_1$ is not produced. The AND circuit 25 produces an output signal when it receives simultaneously both of the signals $\lambda_1$ and $-w_3$ from the electronic control circuit 23. The OR circuit 26 produces an output when it receives at least one of the signals $-w_1$, $\lambda_1$ and $-w_3$ from the electronic control circuit 23.

The OR circuit 29 produces an output when at least one of the AND circuits 24 and 25 produces an output signal, to energize the inlet solenoid 20 to switch the inlet valve 14 to the right in FIG. 3, thereby to bring the control chambers 12,12' of the wheel cylinder 6 into communication with the pump P and accumulator 13. The AND circuit 30 produces an output when the output from the OR circuit 26 is available while the electronic control circuit 23 does not produce the output signal $+w_2$, thereby to energize the outlet solenoid 21 to switch the outlet valve 19 to the left as viewed in FIG. 3 thereby to disconnect the control chambers 12,12' of the wheel cylinder from the oil reservoir T.

The control circuit for controlling the operation of the solenoids 20,21 is constructed as described above. Therefore, the solenoids 20 and 21 are controlled as follows in accordance with the change in wheel speed signal $V_w$ and the wheel acceleration signal $\dot{V}_w$.

When the wheel speed signal $V_w$ is smaller than the comparatively small first reference wheel speed signal $V_R^1$, while the wheel acceleration signal $\dot{V}_w$ is smaller than the reference wheel deceleration signal $-\dot{V}_{w3}$, or when the wheel speed signal $V_w$ is smaller than the second reference wheel speed $V_R^2$ which is smaller than the first one $V_R^1$ while the wheel acceleration signal $\dot{V}_w$ is smaller than the first reference wheel acceleration signal $\dot{V}_{w1}$, the solenoid 20 is energized to switch the inlet valve 14 to the right as viewed in FIG. 3, so that the control chambers 12,12' of the wheel cylinder 6 are brought into communication with the pump P and the accumulator 13. At the same time, when the wheel speed signal $V_w$ is smaller than the first reference wheel speed $V_R^1$ or when the wheel acceleration signal $\dot{V}_w$ is greater than the first reference wheel acceleration signal $+\dot{V}_{w1}$ or when the wheel acceleration signal $\dot{V}_w$ is smaller than the reference wheel deceleration signal $-\dot{V}_{w3}$, while the wheel acceleration signal $\dot{V}_w$ is smaller than the second reference wheel acceleration signal $+\dot{V}_{w2}$ which is greater than the first one $+\dot{V}_{w1}$, the outlet solenoid 21 is energized to switch the outlet valve 19 to the left as viewed in FIG. 3, thereby to disconnect the control chambers 12,12' of the wheel cylinder 6 from the oil reservoir T. In consequence, the braking torque of the antiskid braking device operated by the control circuit shown in FIG. 4 is changed in accordance with the change of the wheel speed $V_w$, wheel acceleration $\dot{V}_w$ and so forth in a manner shown in FIG. 5.

Figure 5:
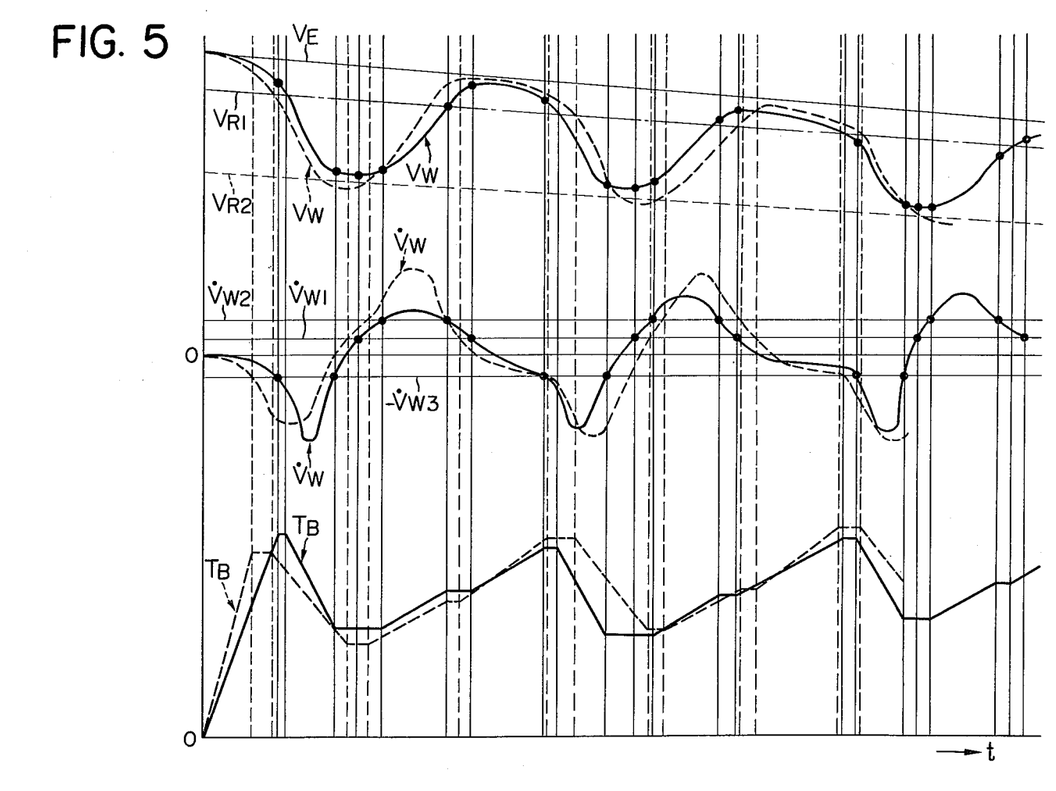
FIG. 5 is a diagram illustrating a braking torque controlling method in accordance with the invention.

In FIG. 5, the solid line curves show the state of braking on a road having a comparatively high coefficient of friction, while the broken line curves show the characteristic as obtained when the vehicle runs on a slippery road having a comparatively low coefficient of friction. As will be understood from FIG. 5, during the braking on the road having a comparatively high friction coefficient, the wheel speed $V_w$ does not drop below the second reference wheel speed $V_R^2$ which is determined by the slip rate peculiar to the raod condition and the estimated vehicle speed VE, the braking torque is controlled by the system similar to that shown in FIG. 1 in accordance with the change in the wheel speed $V_w$ and the wheel acceleration $\dot{V}_w$. On a road surface having a comparatively small friction coefficient, the rate of deceleration of the wheel is so large that the wheel speed $V_w$ drops below the second reference wheel speed $V_R^2$. As a result, the decreasing tendency of the braking torque $T_B$ is maintained until the wheel acceleration $\dot{V}_w$ is increased again to exceed the first reference wheel acceleration $\dot{V}_{w1}$. In consequence, the braking torque $T_B$ is controlled by the control system similar to that shown in FIG. 2. It will be seen that the control system shown in FIG. 5 makes a combined use of the systems shown in FIGS. 1 and 2 while eliminating the disadvantages of these systems without losing their advantages.

The antiskid braking device of the type shown in FIG. 3 adopts a so-called fail-safe type construction in which an ordinary braking function is recovered even when the establishment of hydraulic pressure in the control chamber has failed due to a failure in the control hydraulic system through which the control fluid pressure is charged into a discharged out of the control chambers 12,12' of the wheel cylinder 6.

In the antiskid braking system of the kind described, in the event of a clogging in the fluid passage 18 between the control chambers 12,12' of the control hydraulic system and the oil reservoir T, the braking may fail due to a blockage of the working fluid in the control chambers 12,12'. It is, therefore, quite important and necessary to avoid clogging of the fluid passage 18. To this end, it is necessary to make the passage 18 have a sufficiently large cross-sectional area. In the event that the fluid passages 16,15 interconnecting the control chambers 12,12' to the pump P and the pressure source such as the accumulator 13 are clogged, the ordinary braking function is preserved although the supply of the control fluid to the control chambers 12,12' is stopped. Thus, the clogging of the passages 15,16 does not impose serious problems as compared with the clogging in the passage 18. However, since the antiskid function is lost, it is preferred to employ a sufficiently large cross-sectional area for passages 15,16.

An increase of the cross-sectional areas of the passages in the hydraulic control system causes an abrupt rise and drop of the hydraulic pressure in the control chambers. Considering that the time lag of operation of the whole system is constant, an overshoot of the reduction or increase of the braking effort becomes excessively large to amplify the vibration of the chassis resulting in a deteriorated braking sensation.

In order to avoid any deterioration of the braking sensation, it is effective to open and close the inlet valve 14 and the outlet valve 19 intermittently in a vibratory manner, during charging and discharging of the control fluid to and from the control chambers 12,12'. To this end, the inlet solenoid 20 and the outlet solenoid 21 for actuating the inlet valve 14 and the outlet valve 19 are turned on and off intermittently in a vibratory manner. In the braking system shown in FIG. 3, there is the following relationship between the states of the inlet solenoid 20 and outlet solenoid 21, and the braking torque.

| INLET SOLENOID 20 | OUTLET SOLENOID 21 | BRAKING TORQUE |
| --- | --- | --- |
| off | off | increase |
| off | on | constant |
| on | on | decrease |

Therefore, when the braking torque is increased, i.e. when both the inlet solenoid 20 and the outlet solenoid 21 are turned off, the outlet solenoid 21 is intermittently turned on and off in a vibratory manner while the inlet solenoid 20 is kept off. On the contrary, when the braking torque is decreased, i.e. when both the inlet solenoid 20 and the outlet solenoid 21 are turned on, the inlet solenoid 20 is intermittently turned on and off in a vibratory manner while the outlet solenoid 21 is kept in on state.

Figure 4:
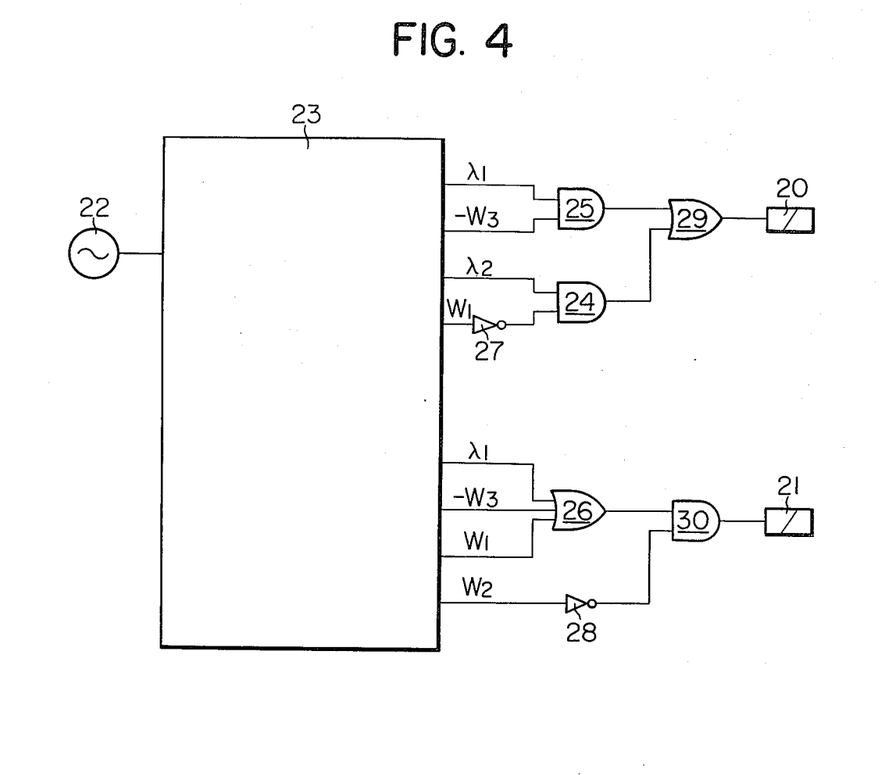
FIG. 4 is a circuit diagram of an electric circuit for controlling the antiskid braking apparatus as shown in FIG. 3.

In the control circuit shown in FIG. 4, however, the braking torque increase signal for increasing the braking torque is produced even during normal running of the vehicle, so that, when the above-described method is applied directly, the outlet solenoid 21 is continuously turned on and off during running to cause a hunting of the outlet valve 19 resulting in a deteriorated durability of the valve and solenoid.

In order to avoid this disadvantage, it is necessary to limit the on-off operation only to the period during the braking. To this end, the vibratory turning on an off of the outlet is allowed only from the moment at which the signal $-w_3$ or $\lambda 1$ is produced, i.e. the moment at which the wheel acceleration signal $\dot{V}_w$ has dropped below the reference wheel deceleration signal $-\dot{V}_{w3}$ or the moment at which the wheel speed $V_w$ drops below the first reference wheel sped $V_R^1$ until the moment at which the vehicle speed has dropped to such a level as not to necessitate the antiskid brake control, e.g. 7 to 10 km/h or until the driver stops the braking operation.

Figure 6:
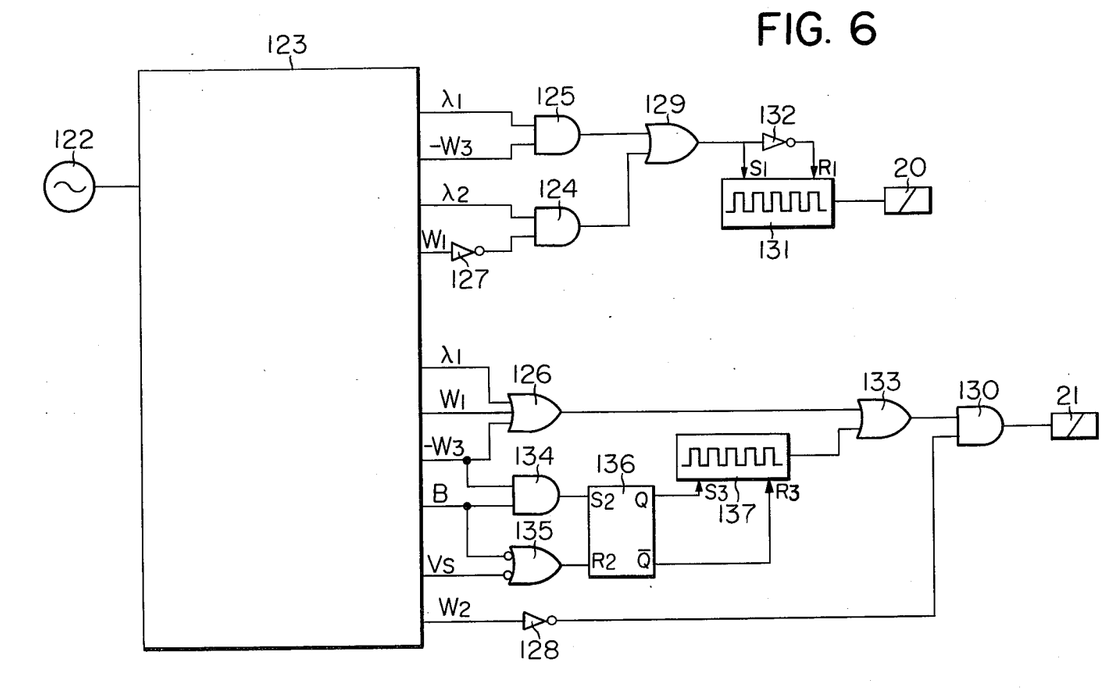
FIGS. 6 to 8 are circuit diagrams of different embodiments of the electric circuit shown in FIG. 4.

FIG. 6 shows another embodiment of the control circuit shown in FIG. 4. More specifically, the circuit shown in FIG. 6 has, in addition to the elements of the control circuit shown in FIG. 4, as circuit for turning on and off the outlet solenoid 21 and the inlet solenoid 20 during increase and decrease of the braking torque, as stated before.

Referring to FIG. 6, a wheel speed detector 122 associated with the inlet solenoid 20, electronic control circuit 123, AND circuit 124, AND circuit 125, OR circuit 129 and inverter 127 correspond to the wheel speed detector 22, electronic control circuit 23, AND circuit 24, AND circuit 25, OR circuit 29 and the inverter 27 of the system shown in FIG. 4, respectively, and are connected in the same manner as that in FIG. 4.

The output from the OR circuit 129 is delivered to the set terminal S₁ of a pulse signal generating circuit 131 and to the reset terminal R₁ of circuit 131 through the inverter 132. The pulse signal generating circuit 131 is adapted, when its set terminal S₁ receives the output from the OR circuit 129, to deliver a pulse signal to the inlet solenoid 20 to turn the latter on and off in a vibratory manner.

The OR circuit 126, invertor 218 and the AND circuit 130 associated with the outlet solenoid 21 correspond to the OR circuit 26, inverter 28 and the AND circuit 30 of the control circuit shown in FIG. 4. Namely, the output signal from the OR circuit 126 is delivered to the AND circuit 130 through an OR circuit 133. The AND circuit 130 produces an output only when it receives outputs from both of the OR circuit 133 and the inverter 128, thereby to actuate the outlet solenoid 21. The electronic control circuit 123 produces, as in the case of the electronic control circuit 23 shown in FIG. 4, output signals $\lambda_1$, $\lambda_2$, $+w_1$, $+w_2$ and $-w_3$. In addition, the electronic control circuit 123 produces, during the braking, a braking signal B and delivers the same to an AND circuit 134 and an OR circuit 135 with an inverter. Furthermore, when the estimated vehicle speed VE is higher than a predetermined speed (7 to 10 Km/h, for example), the electronic control circuit 123 produces an output signal VS and delivers the same to an OR circuit 135 with an inverter. The AND circuit 134 delivers, upon receipt of signals $-w_3$ and B from the electronic control circuit 123, an output signal to the set terminal S₂ of a flip-flop circuit 136, while the OR circuit 135 with inverter delivers an output signal to the reset terminal R₂ of the flip-flop circuit 136 when either the output signal B or VS from the electronic control circuit 123 is absent. The flip-flop circuit 136 is adapted to produce an output signal at its output terminal Q and deliver the same to the set terminal S₃ and a pulse signal generating circuit 137 when its set terminal S₂ receives a signal from the AND circuit 134. When the reset terminal R₂ of the flip-flop circuit 136 receives the output from the OR circuit 135 with inverter, the flip-flop circuit 136 produces at its output terminal Q an output signal which is delivered to the reset terminal R₃ of the pulse signal generating circuit 137. The pulse signal generating circuit 137 produces an output pulse signal and delivers the same to the OR circuit 133 when its set terminal S₃ receives a signal but stops to generate the output pulse signal when a signal is delivered to its reset terminal R₃.

In consequence, the outlet solenoid 21 is turned on and off in a vibratory manner when the electronic control circuit 123 is producing the signals $-w_s$, B and VS but not producing the signals $\lambda_1$, $W_1$, and $w_2$, i.e. when the wheel acceleration signal $\dot{V}_w$ is smaller than a reference wheel deceleration signal $-\dot{V}_{w3}$ while the wheel speed signal $V_w$ is smaller than the first reference wheel speed signal $V_R{}^1$, because the pulse signal produced by the pulse signal generating circuit drives the outlet solenoid 21 in a vibratory manner. The generation of the pulse signal is stopped when the vehicle speed drops to a value to reset the flip-flop circuit 136.

The AND circuit 134 may receive the signal $\lambda 1$ instead of the signal $-w_3$ from the electronic control circuit 123.

When the vehicle travels from a road having a comparatively high friction coefficient to a slippery road having a comparatively low friction coefficient, it is necessary to abruptly decrease the braking torque in order to avoid locking of the wheel. In the control circuit shown in FIG. 6, the rate of decrease of the braking torque is small because the inlet solenoid 20 is turned on and off intermittently in a vibratory manner, so that a considerably long time is required until the braking torque is reduced to a sufficiently low level. During the reduction of the braking force, the wheel speed is dropped largely to impart a bad braking sensation. In this case, therefore, it is necessary to stop the repeated turning on and off of the inlet solenoid 20 to quickly reduce the braking torque.

Figure 7:
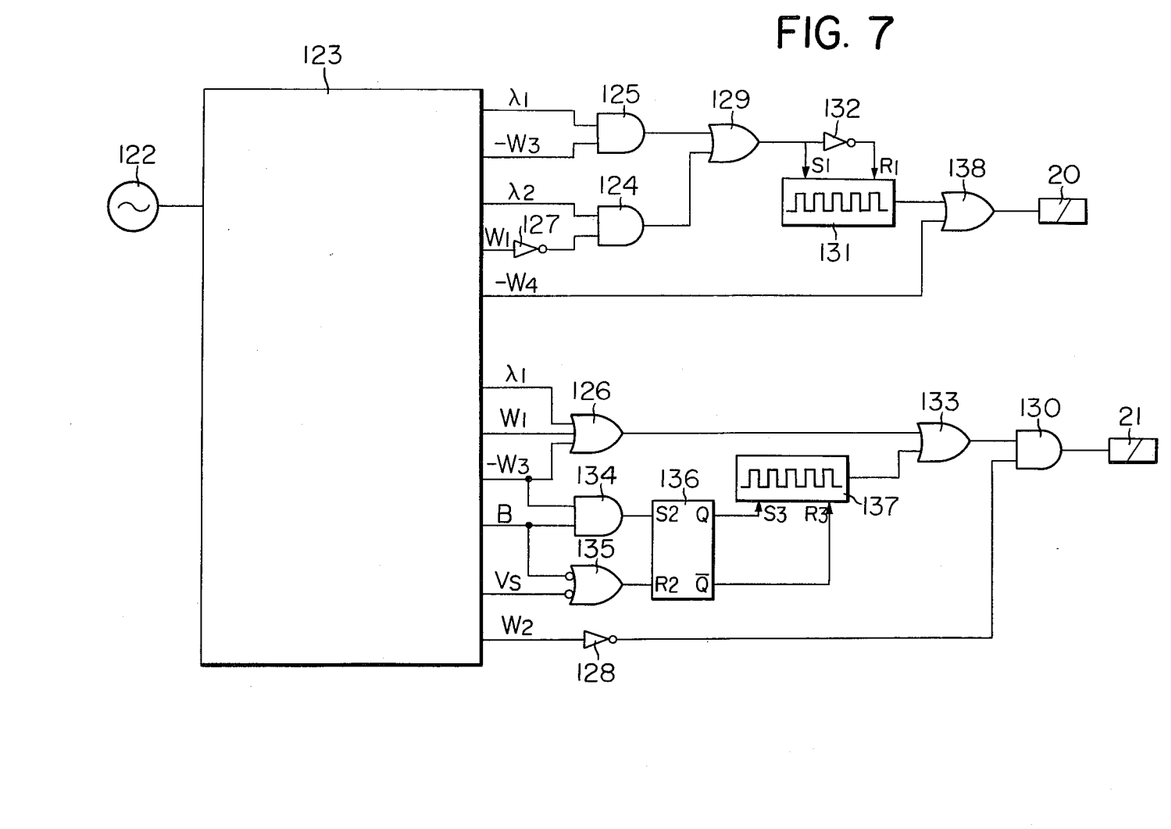

FIG. 7 shows an embodiment of a control circuit which can satisfy the above-mentioned requirement. In this embodiment, the output from the pulse signal generating circuit 131 is delivered to inlet solenoid 20 through an OR circuit 138. At the same time, the electronic control circuit 123 produces a signal $-w_4$ when the wheel acceleration signal $\dot{V}_w$ has dropped below a second reference wheel deceleration signal $-\dot{V}_{w4}$ which is greater than the reference wheel deceleration signal $-\dot{V}_{w3}$. This signal $-w_4$ is delivered to the OR circuit 138. In other respects, the construction and operation of the circuit in FIG. 7 are materially identical to those of the circuit shown in FIG. 6 and the common elements are designated by the same reference numerals.

In this embodiment, therefore, when the wheel acceleration signal $\dot{V}_w$ has dropped below the second reference wheel deceleration signal $-\dot{V}_{w4}$ due to an abrupt reduction of the friction coefficient of the road surface during braking, the electronic control circuit 123 delivers the signal $-w_4$ to the input solenoid 20 through the OR circuit 138, so that the inlet solenoid 20 immediately stops to convert the on-off operation to a continuous on state.

Figure 8:
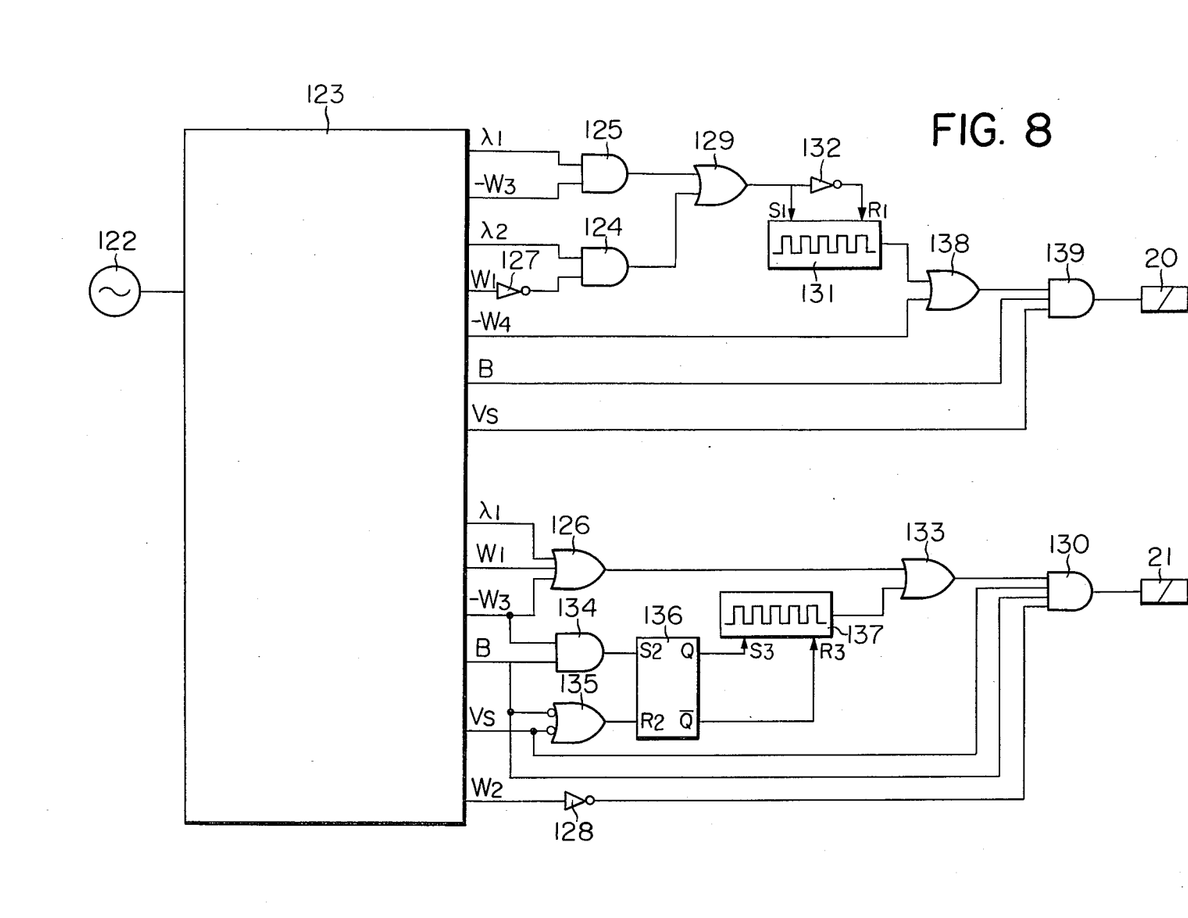

FIG. 8 shows a modification of the control circuit shown in FIG. 7 for stopping the operation of the hydraulic control system when the brake is not used and when the vehicle speed is so low as not to require the antiskid brake control. More specifically, the output from the OR circuit 138 is delivered to the inlet solenoid 20 through an AND circuit 139 to which are also delivered output signals B and VS from the electronic control circuit 123. At the same time, the signals B and VS are also delivered to the AND circuit 130 associated with the outlet solenoid 21. In other respects, the construction and operation of the circuit in FIG. 8 are materially identical to that of FIG. 7 and the common elements are designated at the same reference numerals. In this example, therefore, neither the AND circuit 130 nor the AND circuit 139 produce an output signal when the signals B and VS from the electronic circuit 123 are not available, i.e. when the estimated vehicle speed is below a predetermined value while the brake is not used, so that both the outlet solenoid 21 and the inlet solenoid 20 are kept de-energized.

What is claimed is:

1. An antiskid brake controlling method comprising: comparing, during braking of a vehicle, a wheel speed signal $V_w$ representative of the peripheral speed of a wheel of the vehicle with a first reference wheel speed signal $V_R1$ less than a vehicle speed signal $V_E$ and with a second reference wheel speed signal $V_R2$ which is less than said first reference wheel speed signal $V_R1$; comparing a wheel acceleration signal $\dot{V}_w$ representative of the peripheral acceleration of said wheel with a first reference wheel acceleration signal $\dot{V}_{w1}$ representing a predetermined positive peripheral acceleration of said wheel, a second reference wheel acceleration signal $\dot{V}_{w2}$ greater than said first reference wheel acceleration signal and a reference wheel deceleration signal $-\dot{V}_{w3}$ representative of a predetermined negative peripheral acceleration of said wheel; decreasing the braking torque $T_B$ from an instant at which said wheel acceleration signal $\dot{V}_w$ has dropped below said reference wheel deceleration signal $-\dot{V}_{w3}$ when said wheel speed signal $V_w$ is less than said first reference wheel speed signal $V_{R}1$ but greater than said second reference wheel speed signal $V_{R}2$; stopping the decrease of the braking torque $T_B$ after said wheel acceleration signal $\dot{V}_w$ comes to increase again, at an instant at which said wheel acceleration signal $\dot{V}_w$ exceeds said reference wheel deceleration signal $-\dot{V}_{w3}$; and also decreasing the braking torque $T_B$ until the wheel acceleration signal $\dot{V}_w$ increases to exceed said first reference wheel acceleration signal $\dot{V}_{w1}$ when said wheel speed signal $\dot{V}_w$ has dropped below said second reference wheel speed signal $V_{R}2$.

2. A method as claimed in claim 1 wherein the decrease of the braking torque is effected intermittently in a vibratory manner.

3. A method as claimed in claim 2 comprising halting the intermittent and vibratory decrease of the braking torque and effecting continuous decrease of the braking torque when the wheel deceleration signal $\dot{V}_w$ drops below said second reference wheel deceleration signal $\dot{V}_{w2}$.

4. A method as claimed in claim 2 wherein the intermittent and vibratory decrease of the braking torque is effected only if the vehicle speed exceeds a predetermined value.

5. A method as claimed in claim 1 wherein the second reference wheel speed signal is less than the first reference wheel speed signal by an amount corresponding to the slip rate of the wheel.

6. A method as claimed in claim 1 wherein the decrease of the braking torque in response to the wheel speed signal $V_w$ being below the reference signal $V_R2$ is effected until the instant at which the wheel acceleration signal $\dot{V}_w$ exceeds the reference signal $\dot{V}_{w1}$.

7. An antiskid brake controlling device for use with wheeled vehicles comprising:
a fluid brake mechanism associated with a vehicle wheel and including a master cylinder for producing brake fluid pressure in accordance with the brake input of an operator, an operating member, a first fluid chamber defined on one side of said operating member and communicating with said master cylinder for driving the operating member under the action of fluid pressure in said master cylinder, and a second fluid chamber defined on the opposite side of said operating member to apply thereto a fluid pressure counteracting the fluid pressure applied to said operating member on said one side thereof;
a source of fluid pressure;
a high-pressure fluid line connecting said second chamber and said source of fluid pressure;
a fluid reservoir;
a low-pressure fluid line connecting said second chamber and said fluid reservoir;
an inlet valve in said high-pressure line for opening and closing said high-pressure line;
an outlet valve in said low-pressure line for opening and closing said low-pressure line;

command system means for controlling the operation of said inlet and outlet valves, said command system means including first comparator means for comparing, during braking of the vehicle, a wheel speed signal $V_w$ representative of the peripheral speed of the wheel of the vehicle with a first reference wheel speed signal $V_{R}1$, and with a second reference wheel speed signal $V_{R}2$ less than said first reference wheel speed signal $V_{R}1$, and second comparator means for comparing a wheel acceleration signal $\dot{V}_w$ representative of the peripheral acceleration of said wheel with a first reference wheel acceleration $\dot{V}_{w1}$ representing a positive peripheral acceleration of said wheel, a second reference wheel acceleration signal $\dot{V}_{w2}$ greater than said first reference wheel acceleration signal $\dot{V}_{w1}$ and a reference wheel deceleration signal $-\dot{V}_{w3}$ representative of a predetermined negative peripheral acceleration of said wheel and means responsive to the first and second comparator means for controlling said inlet and outlet valves for decreasing the braking torque from an instant at which the wheel acceleration signal $\dot{V}_w$ drops below said reference wheel deceleration signal $-\dot{V}_{w3}$ when said wheel speed signal $\dot{V}_w$ is less than said first reference wheel speed signal $V_{R}1$ and greater than said second reference wheel speed signal $V_{R}2$, for halting the decrease of the braking torque after said wheel acceleration signal $\dot{V}_w$ comes to increase again at the instant when the signal $\dot{V}_w$ exceeds said reference wheel deceleration signal $-\dot{V}_{w3}$, and for also decreasing the braking torque until the wheel acceleration signal $\dot{V}_w$ increases to exceed said first reference signal $\dot{V}_{w1}$ when said wheel speed signal $V_w$ has dropped below said second reference wheel speed signal $V_{R}2$.

8. An antiskid brake controlling device as claimed in claim 7 wherein said means for controlling said inlet and outlet valves is operative such that during the braking operation, said inlet valve is opened and said outlet valve is closed to increase the fluid pressure in said second chamber when said wheel speed signal $V_w$ is less than said first reference wheel speed signal $V_{R}1$ but greater than said second reference wheel speed signal $V_{R}2$; said inlet and outlet valves are closed to maintain the fluid pressure in said second chamber at a constant level when said wheel acceleration signal $\dot{V}_w$ is increasing and has exceeded said reference wheel deceleration signal $-\dot{V}_{w3}$; and said inlet valve is opened and said outlet valve is closed to increase again the fluid pressure in said second chamber until the wheel acceleration signal $V_2$ is recovered to exceed said first reference wheel acceleration signal $\dot{V}_{w1}$ when said wheel speed signal $V_w$ has dropped below said second reference wheel speed signal $V_{R}2$.

9. An antiskid brake controlling device as claimed in claim 8 further comprising means for intermittently opening and closing said inlet valve in a vibratory manner upon increase in fluid pressure in said second chamber.

10. An antiskid brake controlling device as claimed in claim 9, comprising means for stopping the intermittent opening and closing of said inlet valve and simultaneously placing said inlet valve in a continuously opened condition to rapidly decrease said braking torque when said wheel deceleration signal $\dot{V}_w$ has dropped below said second reference wheel deceleration signal $\dot{V}_{w2}$.

11. An antiskid brake controlling device as claimed in claim 9, comprising means for allowing the intermittent opening and closing of said inlet valve only when the vehicle speed signal $V_E$ is in excess of a predetermined value during braking.

12. An antiskid brake controlling device as claimed in claims 8 or 9, comprising means for intermittently opening and closing said outlet valve in a vibratory manner upon decrease in fluid pressure in said second chamber.

13. An antiskid brake controlling device as claimed in claim 12, comprising means for allowing the intermittent opening and closing of said outlet valve only when the vehicle speed signal $V_E$ is in excess of a predetermined value during braking.

14. An antiskid brake controlling device as claimed in claim 7 wherein said inlet valve is normally closed and said outlet valve is normally open.

15. An antiskid brake controlling device for use with wheeled vehicles comprising:
   a fluid brake mechanism associated with a vehicle wheel and including a master cylinder for producing brake fluid pressure in accordance with brake input of an operator, an operating member, a first fluid chamber defined on one side of said operating member and communicating with said master cylinder for driving the operating member under the action of fluid pressure in said master brake cylinder, and a second fluid chamber defined on the opposite side of said operating member to apply thereto a fluid pressure counteracting the fluid pressure applied to said operating member on said one side thereof;
   a source of fluid pressure;
   a high-pressure fluid line connecting said second chamber and said source of fluid pressure;
   a fluid reservoir;
   a low-pressure fluid line connecting said second chamber and said fluid reservoir;
   an inlet valve in said high-pressure line for opening and closing said high-pressure line;
   an outlet valve in said low-pressure line for opening and closing said low-pressure line;
   command system means for controlling the operation of said inlet and outlet valves for effecting an antiskid brake controlling operation in which: fluid pressure in said first chamber is increased in accordance with the operator's braking input during brake application to apply braking torque to said wheel; hydraulic pressure in said second chamber is increased when the braking torque applied to said wheel is excessively increased to cause wheel locking; and decreased when the braking torque is sufficiently reduced so that there is no possibility of wheel locking; and
   means for intermittently opening and closing said inlet and outlet valves respectively in a vibratory manner to reduce the flow rate of fluid coming into or outgoing from said second chamber when fluid pressure in said second chamber is increased or decreased.

16. An antiskid brake controlling device as claimed in claim 15 wherein said means for intermittently opening and closing said inlet and outlet valves including pulse signal generating means.

17. An antiskid brake controlling device as claimed in claim 16 wherein said command system means includes first comparator means for comparing, during braking of the vehicle, a wheel speed signal $V_w$ representative of the peripheral speed of the wheel of the vehicle with a first reference wheel speed signal $V_R1$, and with a second reference wheel speed signal $V_R2$ less than said first reference wheel speed signal $V_R1$, and second comparator means for comparing a wheel acceleration signal $\dot{V}_w$ representative of the peripheral acceleration of said wheel with a first reference wheel acceleration $\dot{V}_{w1}$ representing a positive peripheral acceleration of said wheel, a second reference wheel acceleration signal $\dot{V}_{w2}$ greater than said first reference wheel acceleration signal $V_{w1}$, a reference wheel deceleration signal $-\dot{V}_{w3}$ representative of a predetermined negative peripheral acceleration of said wheel and a second reference wheel decelerator signal $-\dot{V}_{w4}$ representative of a negative peripheral acceleration of said wheel having an absolute value greater than deceleration signal $-\dot{V}_{w3}$, said means for intermittently opening and closing said valves being operative such that when the wheel speed signal $V_w$ is smaller than the first reference wheel speed $V_R1$ and greater than the second reference wheel speed $V_R2$, the inlet valve is opened and closed intermittently and the outlet valve is closed from the instant at which the wheel acceleration signal $\dot{V}_w$ has dropped below the first reference wheel deceleration signal $-\dot{V}_{w3}$ to decrease the braking torque $T_B$, whereafter the inlet valve is closed at the moment at which the wheel acceleration signal $V_w$ is increased to exceed the reference wheel deceleration signal $-\dot{V}_{w3}$ to stop the decrease of the braking torque, whereupon when the wheel speed signal $\dot{V}_w$ has dropped below the second reference wheel speed signal $V_R2$, the outlet valve is opened and closed intermittently to decrease the braking torque until the wheel acceleration signal $V_w$ is recovered to exceed the first reference wheel acceleration signal $\dot{V}_{w1}$, the intermittent opening and closing of the inlet valve being stopped when the wheel acceleration signal $V_w$ has become smaller than reference wheel deceleration signal $-\dot{V}_{w4}$ while the inlet valve is opened continuously to abruptly decrease the braking torque $T_B$.

* * * * *